(12) United States Patent
Zeller et al.

(10) Patent No.: US 12,201,933 B2
(45) Date of Patent: Jan. 21, 2025

(54) DEVICE FOR THE TREATMENT OF FLUID MIXTURES

(71) Applicant: HYDAC PROCESS TECHNOLOGY GMBH, Neunkirchen (DE)

(72) Inventors: Sergej Zeller, Katzweiler (DE); Michael Welker, Eppelborn (DE); Michael Grünbeck, Mandelbachtal (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 450 days.

(21) Appl. No.: 17/788,022

(22) PCT Filed: Jan. 13, 2021

(86) PCT No.: PCT/EP2021/050563
§ 371 (c)(1),
(2) Date: Jun. 22, 2022

(87) PCT Pub. No.: WO2021/164956
PCT Pub. Date: Aug. 26, 2021

(65) Prior Publication Data
US 2023/0024079 A1 Jan. 26, 2023

(30) Foreign Application Priority Data
Feb. 21, 2020 (DE) .................... 10 2020 001 124.1

(51) Int. Cl.
*B01D 19/00* (2006.01)
*B01D 46/00* (2022.01)
*G01F 23/74* (2006.01)
*G01F 23/76* (2006.01)

(52) U.S. Cl.
CPC ..... *B01D 46/0031* (2013.01); *B01D 19/0031* (2013.01); *B01D 19/0063* (2013.01); *G01F 23/74* (2013.01); *G01F 23/76* (2013.01)

(58) Field of Classification Search
CPC .............. B01D 46/0031; B01D 46/003; B01D 19/0031; B01D 19/0063; G01F 23/74; G01F 23/76
(Continued)

(56) References Cited

U.S. PATENT DOCUMENTS 3,507,098 A * 4/1970 Veres .................... F22B 37/265
251/35
3,966,437 A    6/1976 DeWolf et al.
(Continued)

FOREIGN PATENT DOCUMENTS

DE    38 34 986    4/1990
DE    198 30 416    12/1999
(Continued)

OTHER PUBLICATIONS

International Search Report (ISR) issued Apr. 13, 2021 in International (PCT) Application No. PCT/EP2021/050563.

*Primary Examiner* — Frank M Lawrence, Jr.
(74) *Attorney, Agent, or Firm* — Wenderoth, Lind & Ponack, L.L.P.

(57) ABSTRACT

A device for the treatment of fluid mixtures containing gases, such as in particular hydrogen, air, nitrogen or noble gases, and liquids, such as in particular ionic liquids, hydraulic oil or process liquids, having at least one separating stage (30) for separating the fluid mixture into a gas portion and a liquid portion, which, routed into a collection space (32), results in a float (44) rising, which, at a predeterminable liquid level in the collection space (32), actuates, without contact, a sensor device (42), which preferably actuates a discharge device for the purpose of draining the collection space (32), resulting in the lowering of the float (44), is characterized in that the outer circumference of the float (44) is guided axially displaceably along the inside of the housing wall (54) of the collection space (32), and in that the float (Continued)

(44) has at least one point of passage (50) for gas and/or liquid, which interconnects parts of the collection space (32) in a media-conveying manner, which parts are spatially separated from one another by the float (44).

15 Claims, 4 Drawing Sheets

(58) Field of Classification Search
USPC .......................... 96/408, 409, 410, 411, 412
See application file for complete search history.

(56) References Cited

U.S. PATENT DOCUMENTS 4,925,466 A    5/1990   Overby

| | | |
|---|---|---|
| 5,174,944 A * | 12/1992 | LeBeck ............. B01D 19/0063 |
| | | 266/252 |
| 5,209,106 A | 5/1993 | Carlin |
| 5,743,138 A | 4/1998 | Cheng |
| 2002/0023836 A1 | 2/2002 | Byron, Jr. et al. |
| 2014/0283931 A1 | 9/2014 | Zaro et al. |
| 2017/0225101 A1 | 8/2017 | Schlichter et al. |
| 2019/0204136 A1 | 7/2019 | Fitzgerald et al. |

FOREIGN PATENT DOCUMENTS

| | | |
|---|---|---|
| DE | 10 2012 017 101 | 5/2014 |
| DE | 10 2014 012 094 | 2/2016 |
| EP | 0 409 349 | 1/1991 |
| EP | 2 340 867 | 7/2011 |
| GB | 1 414 308 | 11/1975 |
| WO | 2008/079202 | 7/2008 |

* cited by examiner

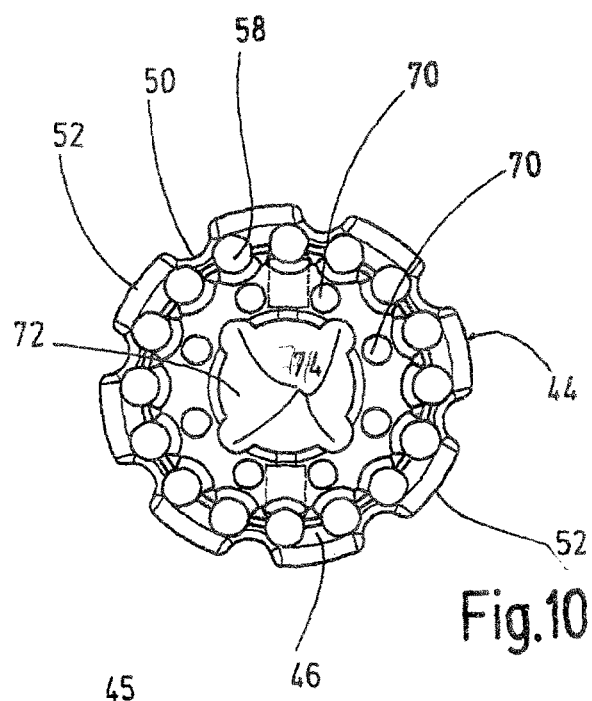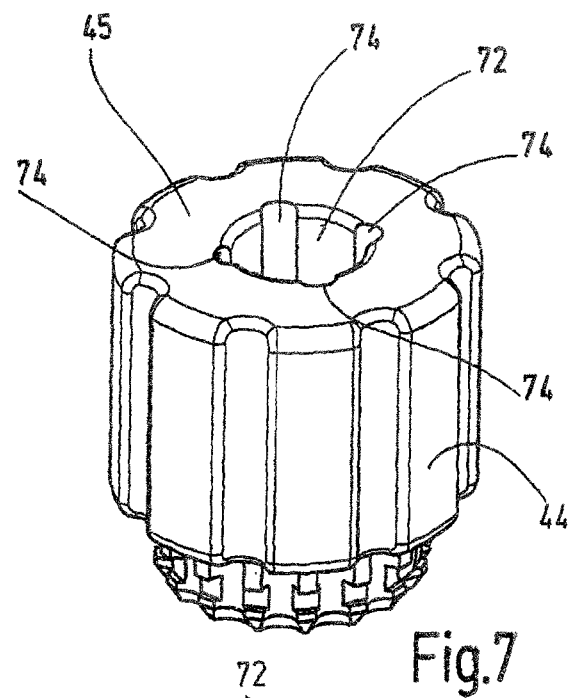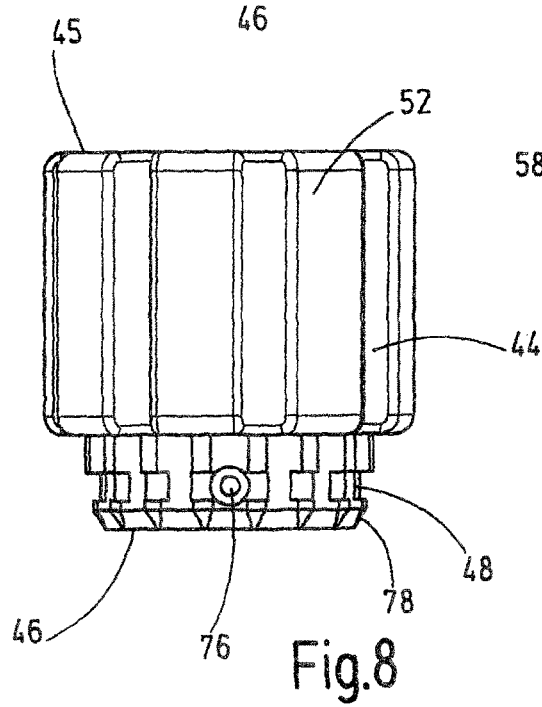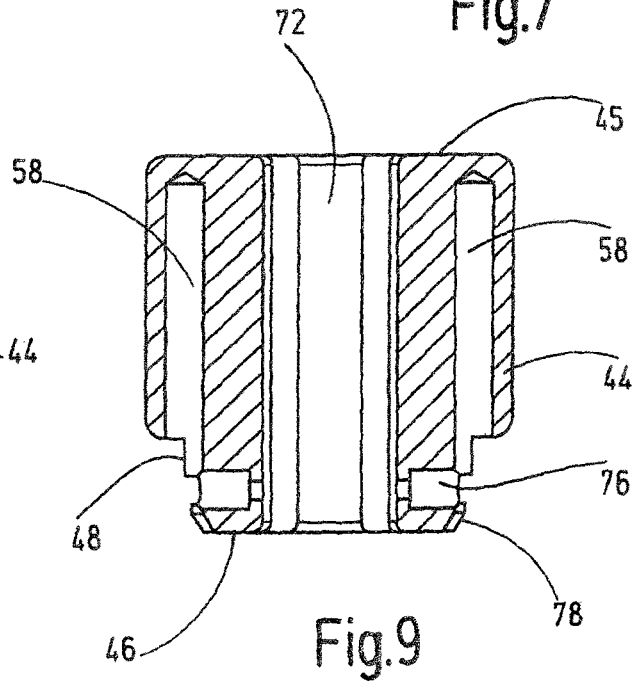

DEVICE FOR THE TREATMENT OF FLUID MIXTURES

The invention relates to a device for the treatment of fluid mixtures containing gases, such as in particular hydrogen, air, nitrogen or noble gases, and liquids, such as in particular ionic liquids, hydraulic oil or process liquids, having at least one separation stage for separating the fluid mixture into a gas portion and a liquid portion, which, routed into a collection space, results in a float rising, which, at a predeterminable liquid level in the collection space, actuates, without contact, a sensor device, which preferably actuates a discharge device for the purpose of draining the collection space, resulting in the lowering of the float. More specifically, the device relates to the treatment of a high-pressure fluid mixture containing gas, such as hydrogen, and small portions of liquids, such as ionic liquids.

In more recent times, hydrogen has been made available at filling stations for hydrogen-powered vehicles at high pressures of approx. 500 to 1000 bar. It is advantageous to use so-called ionic compressors for compressing hydrogen, having a design comparable to a conventional piston compressor, wherein, however, an ionic liquid column is used for pressure transmission instead of a piston. The liquid acting as a displacer element has the advantage over a displacer piston that it is better able to dissipate the heat generated, because a certain amount thereof is transported away from the compressor with the compressed gas. Ionic liquids are known to be organic salts that are liquid at temperatures below 100° C. without the salt being dissolved in a solvent such as water. At the high-pressure level, liquid portions are unintentionally introduced into the gas during operation of the ionic compressors, for example, when seals fail, diaphragms rupture, etc. Technically, this entry is also known as carryover and requires a treatment of the fluid mixture. Without treatment, severe damage can occur to internal combustion engines and fuel cells.

From DE 10 2014 012 094 A1 a generic device for the treatment of such fluid mixtures is known, which device comprises a first separation stage for separating the fluid mixture into a liquid portion and a gas portion, which may be contaminated with a remaining liquid portion. In the known solution, a further separation stage is provided, which cleans the liquid portion accommodated in a collection space of the device, before it is discharged from the device. Because the separation process in the known solution takes place in several stages, a fine separation can be performed in said second separation stage after the first separation process has been performed, so that a concerning liquid portion, such as the ionic liquid, is available again in the purity required for use and can be directly returned into the compression process.

A valve control system, which can be actuated by means of a level indicator in the collection space, is preferably used to control draining processes from the collection space of the device. In detail, a float is provided, which is guided on a rod-like guide in the collection space, which at the same time forms the measuring section for a displacement measuring system, wherein a contact-free sensor device is implemented, for instance using a so-called magnetostrictive measuring method, wherein a waveguide is tensioned within the rod-like guide and the float itself bears a permanent magnet for controlling the waveguide during the travel motion of the float.

Based on this prior art, the invention addresses the problem of further improving the known solution while retaining its advantages in that, preferably, unobstructed operation of the discharge device for the collection space is achieved by means of a float control and that the float itself can move freely without obstructions in the collection space when liquid is collected from the separating stage.

A device having the features of claim 1 in its entirety solves this problem.

In that, according to the characterizing part of patent claim 1, the outer circumference of the float is axially guided in a movable manner along the inside of the housing wall of the collection space and in that the float has at least one point of passage for gas and/or liquid, which interconnects parts of the collection space in a media-conveying manner, which parts are spatially separated from one another by the float, the float body is guided in the collection space without obstructions and any pressure differences impairing the buoyancy process in the liquid portion are minimized via the respective points of passage in the float.

During normal operation, no or only a very small amount of liquid is expected in the process gas, in this case hydrogen gas. A coalescence filter element as a separation stage is used to separate the liquid, in this case in the form of an ionic liquid, from the process gas, which liquid is then, if the device is normally set up vertically, discharged downwards into the chamber-like collection space of the device housing, i.e. below the area of the device having the coalescence filter element, following gravity. In this case, when the liquid is separated in the collection space, the float floats up as a buoyancy body on the present liquid level in the collection space; a process that is detected by the sensor device. The sensor device can preferably continuously monitor the float and, in any case, at a presettable threshold value of a level of the float, the discharge process can be triggered by means of the sensor device, for example by activating a valve device. When the float sinks to a lowest level position, which may be equivalent to a complete emptying of the collection space of liquid, the sensor device enters its unexcited state, resulting in the discharge device closing because an assigned valve is closed. The chamber-like collection space is then again available for a collection of liquid from the process gas.

For the safe guidance of the float, it is guided along the inner wall of the device or the collection space. This does not necessarily mean that the wall parts of the float and the device housing abut; rather, an annular gap between said wall parts can be kept free by building up a kind of liquid film, the build-up of which is fostered by the respective pressure-equalizing point of passage in the float.

The device for treating fluid mixtures according to the invention do not have to be limited to the fluid treatment of compressed hydrogen, but can be used to separate liquid portions from any form of process gas, including air. However, the use of the device for high-pressure applications has proven to be particularly advantageous.

In a preferred embodiment of the device according to the invention, provision is made that the float has a buoyancy aid to compensate for its weight force, which buoyancy aid guides gas portions routed through the separation stage, at least partially, to the inside of the float, which is closed in the direction of the separation stage in a media-conveying manner. The float as a buoyancy body in itself has a given density that provides optimum buoyancy results for a particular application. However, in practice it may happen that a liquid having a lower density appears in the system. This would mean that the buoyancy force of the liquid would then no longer overcome the weight force of the float and there would not be any reliable liquid detection in the collection space. The chambers, which are preferably located on the inside of the float and which, in the vertical operating position of the device, are formed as blind holes and are inserted into the float from below, allow for the trapping of gas portions of the fluid mixture during normal operation, which gas portions aid in reducing the overall weight of the float.

As explained before, normally the float is guided by the very smooth wall of the device housing; in that way, the float can also be used with liquids of significantly lower density and the sensor and discharge function is guaranteed to this extent. However, because some liquids have a high viscosity and thus a high capillary action, a round, cylindrical shape of the float would not suffice to form such a gap between the housing wall and the adjacent float wall for the separated liquid portion to reach the lower area below the float from above for the float's buoyancy. There is also a fundamental risk of the float tipping over in the device housing, so that certain lower tolerances of the outside diameter have to be adhered to in the case of an exclusively cylindrical design. To avoid this problem, in a preferred embodiment of the device according to the invention provision may be made for the float to have longitudinal channels along its outer circumference, which channels are introduced into the float in a groove-like manner and serve as the respective points of passage, each of which channels opens out at the opposing end faces of the float and extends in parallel to the mutually opposite directions of travel of the float in the collection space. These longitudinal channels can form a kind of capillaries, which, on the one hand, aid in further reducing the weight of the float and, at the same time, permit the exchange of highly viscous liquids from above into the area below the float.

Accordingly, for improved guidance, in a preferred embodiment of the device provision can also be made for the float to have a central recess, which is used to guide it along a rod-like guide, wherein the float additionally has groove-like longitudinal channels as respective points of passage, which are introduced into the float in a direction away from the rod-like guide and open out at the opposite end faces of the float. Then the rod guide can also comprise parts of the sensor device.

In a particularly preferred embodiment of the device according to the invention, provision is further made that, viewed in the operating position, a rim is arranged at the underside of the float, which rim is recessed relative to the rest of the circumference and which, equipped with at least one orifice, establishes a media-conveying connection at least between a further longitudinal channel and an assignable chamber in the float, through which chamber the gas portion is routed. The aforementioned orifice introduces a kind of damping between the respective inner and outer channel, which damping enables uninhibited operation of the float in the direction of its respective traversing motion in the device housing, particularly in the case of highly viscous liquid portions. Furthermore, the recessed rim of the float permits the reliable closing of a centrally located, optional fluid outlet in the course of emptying the collection space. Otherwise, at least a part of the orifice openings can be used to insert a permanent magnet into the float as component of the sensing device.

In a particularly preferred embodiment, parts of the sensor device, such as at least one permanent magnet, are in operative connection with other components of the sensor device in the device housing and/or in the guide rod to implement an inductive displacement measuring system in this way. By inserting the permanent magnet or a magnetizable part into the float, its weight force is unintentionally increased accordingly, but this is compensated for by the respective buoyancy aid in the float.

The solution according to the invention will be described in greater detail by way of two exemplary embodiments shown in the drawing. In the figures, in general view, not to scale, FIG. 1 shows a first exemplary embodiment of the device, partly in longitudinal section, partly in view;

FIGS. 7 to 10 show again various views and a longitudinal section of a float as used in the exemplary embodiment of FIG. 6.

Figure 1:
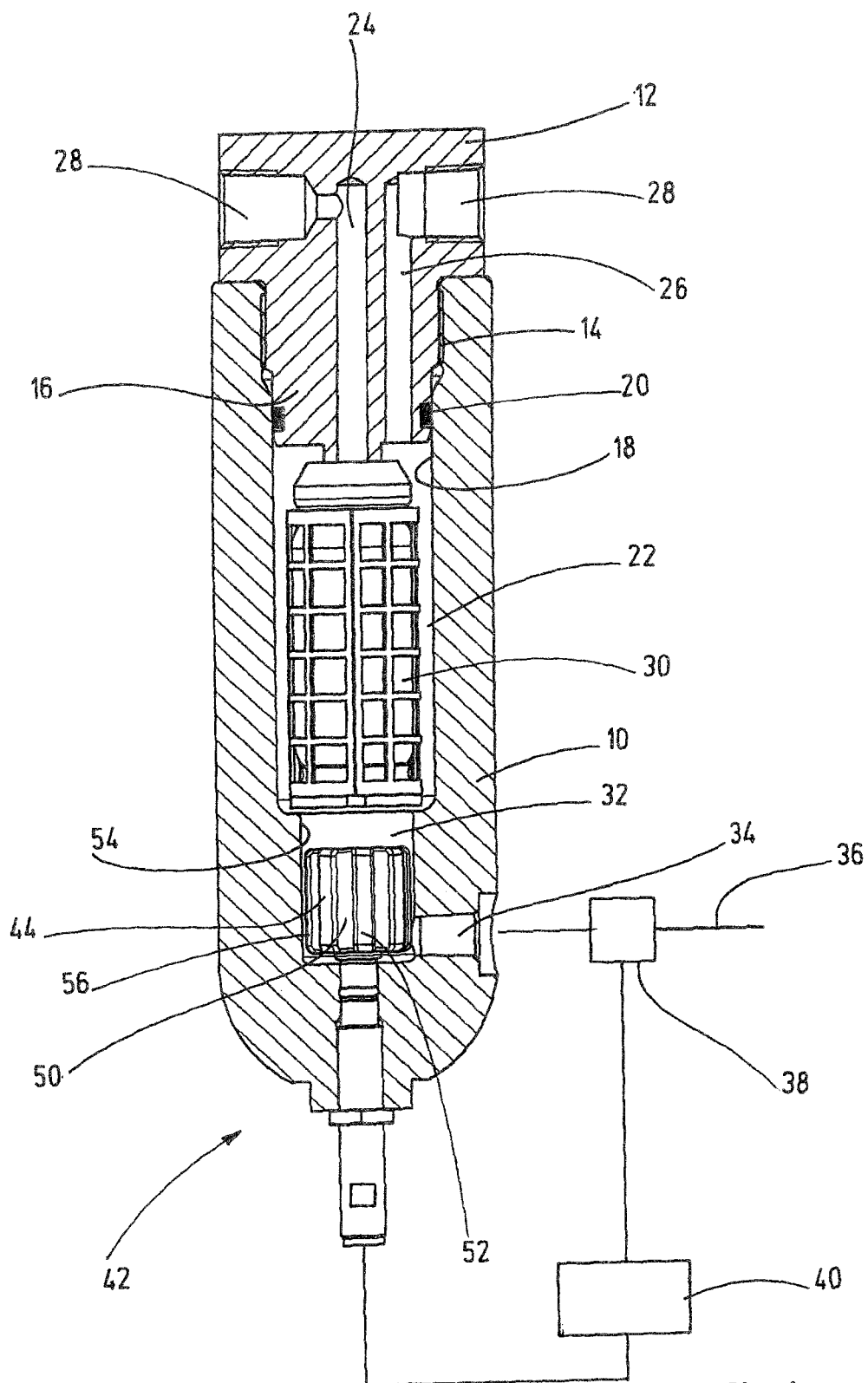

The exemplary embodiment of the device shown in FIG. 1 has an elongated, cup-like housing 10, which, as viewed in the direction of FIG. 1, is closed at the top by an outer, head-like housing part 12. In particular, in the operating position of the device shown in FIG. 1, an internal screw connection 14 is used to connect the head-like housing part 12 to the substantially cylindrical housing 10. The head-like housing part 12 has a cylindrical inner collar 16 with a reduced diameter in contact with the cylindrical inner wall 18 of the cup-like housing 10, and further, the housing part 12 has at this end area an annular seal 20, which seals the interior 22 of the housing 10 from the environment at this place.

The head-end housing part 12 further comprises, in a conventional manner, an inlet channel 24 and an outlet channel 26 for a gas, such as hydrogen, which may unintentionally form a fluid mixture with a liquid portion such as an ionic liquid. Both the inlet channel 24 and the outlet channel 26 extend vertically when viewed in the direction of FIG. 1 and open out at their upper ends into transverse connection holes 28, which are used to connect media-conveying lines that are not shown and are components of an overall hydrogen-generating system that is also not shown. At its lower end, the inlet channel 24 opens centrally into a separating stage 30 in the form of a coalescence filter element. Such a filter element is shown by way of example in DE 10 2012 017 101 A1 and, in addition to separating or isolating a liquid portion from a gas portion of a gas, such as hydrogen, it is also possible to separate particulate contaminants from the gas stream or the fluid mixture. The cleaning or separation is done, with respect to the element 30, from the inside to the outside and the gas rising in the device, such as hydrogen gas, leaves the device via the drain channel 26 and the connection hole 28. This gas stream is then cleaned of particulate contaminants, which remain in the filter element 30. Owing to the coalescing properties of the filter element 30, liquid portions are separated at the bottom end, while droplets are formed, on the filter element 30 and enter a collection space 32, which transitions at the rim end past the filter element 30 into the other interior space 22 of the cup-like housing 10.

In this respect, the collection space 32 for receiving any liquid portions occurring in the fluid mixture with the gas, such as hydrogen, is reduced in diameter compared to the diameter of the other inner chamber 22 and in this respect the filter element 30 at the bottom end with a slight radial projection, but held axially at a distance, overlaps the collection space 32, the inner circumference of which is cylindrical. The filter element 30 does not necessarily have to retain particulate contaminants from the gas stream;

rather, the separation of liquid portions from the gas stream may be sufficient for a safe operation.

A drain hole 34 is introduced transversely in the bottom end of the collection space 32, to which drain hole 34 a liquid line 36 having a valve device 38 is connected. The valve device 38 may consist of a conventional 2/2-way switching valve, which can be actuated in the usual manner by means of an energizable actuating magnet. Such valve devices 38 are customary and therefore it is depicted as a black box only.

The actuating magnet of the valve device 38 is connected to a central control device 40, which in usual design in turn is represented as a black box and which receives its input signals from a sensor device designated as a whole by the reference numeral 42. When such a control signal is transmitted to the control device 40 via the sensor device 42, the control device 40 energizes the actuating magnet of the valve device 38 and the 2/2-way switching valve moves to its open position, in which the liquid line 36 is connected to the collection space 32 of the device in a media-conveying manner, namely via the assigned drain hole 34. If the actuating magnet of the valve device 38 is not energized, it closes and, in that way, shuts off the liquid line 36 and any liquid in the collection space 32 can no longer leave the device.

The filter element 30 is radially encompassed by the housing 10 at a radial distance from the inner wall 18 to facilitate the flow of process gas from the element 30. Furthermore, the element 30 is supported in a replaceable manner on the head-end housing part 12 via a bar-like offset extension and is secured at this location at the head end.

An equally mainly cylindrical float 44 is placed in the cylindrical collection space 32 as shown in detail in FIGS. 2 to 5, wherein the float 44 is shown in its lower end position in FIG. 1, which corresponds to the state when there is no liquid separated from the element 30 in the collection space 32. According to the embodiment shown in FIG. 1, the float 44 can rise from its initial position at the bottom to a maximum fluid level at which the top of the float 44 abuts the bottom of the element 30.

When viewed in longitudinal section through the float 44, its width transverse to the longitudinal direction of the device is equal to its axial overall length in this vertical longitudinal direction. As further shown in FIGS. 2 to 5, the cylindrical float 44 has two planar end faces 45, 46 opposite to each other as viewed in the longitudinal direction, wherein the lower end face 46 has a recessed cylindrical rim 48 projecting downwards, which, according to the representation according to FIG. 1, is in head contact with parts at the housing end of the sensor device 42 in the lowest level position of the float 44.

Figure 4:
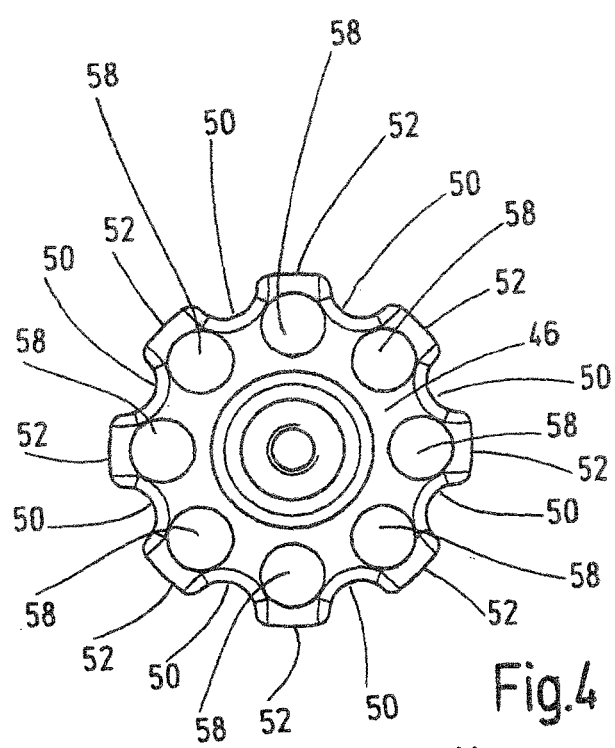
FIGS. 2 to 5 show various views and a longitudinal section of a float as used in the device according to FIG. 1.
Figure 2:
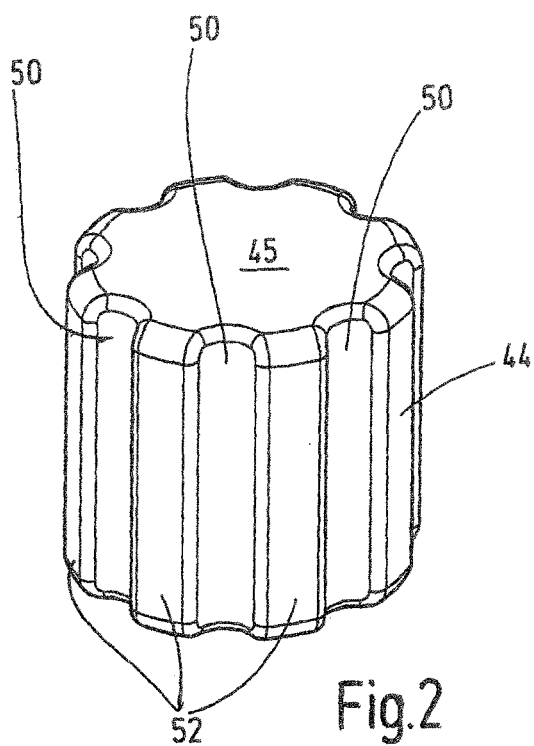
Figure 3:
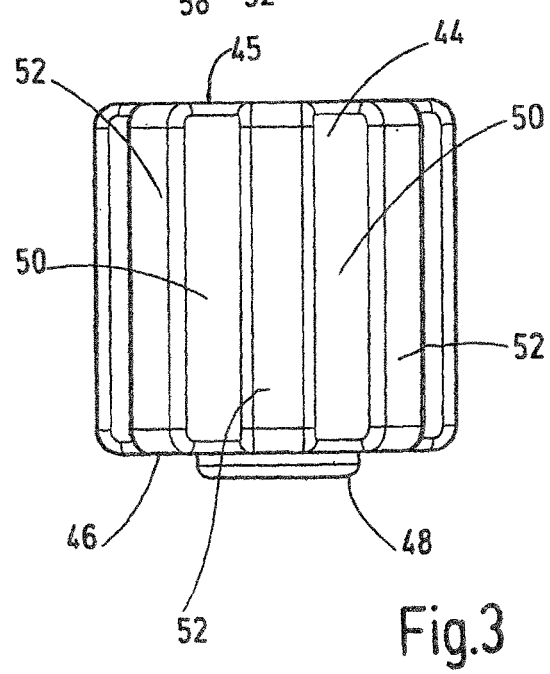

As further shown in FIGS. 2 to 4, the float 44 has individual groove-like longitudinal channels 50 on the outer circumference (8 in total), which follow a virtual circular arc at the bottom, in particular as shown in FIG. 4. The individual longitudinal channels 50 are arranged equidistantly from one another along the outer circumference, and while the groove base of the longitudinal channels 50 is convex in shape when viewed from the outside, the longitudinal bars 52 are provided with a concave curvature projecting outwards. The concave curvatures of the segment-shaped longitudinal bars 52, in turn form a virtual full circle at the rim, the diameter of which is equal to the diameter of the inner wall 54 of the collection space 32 or is designed to be slightly smaller, such that between the outer wall of the float 44, formed by the longitudinal bars 52, and the cylindrical inner wall 54 of the collection space 32, a small fluid-conveying annular gap 56 is formed over the entire length of the float 42. The longitudinal channels 50 extending continuously along the float 44 each form a continuous passageway connecting parts of the collection space 32 above and below the float 44 in a fluid-conveying manner.

Figure 5:
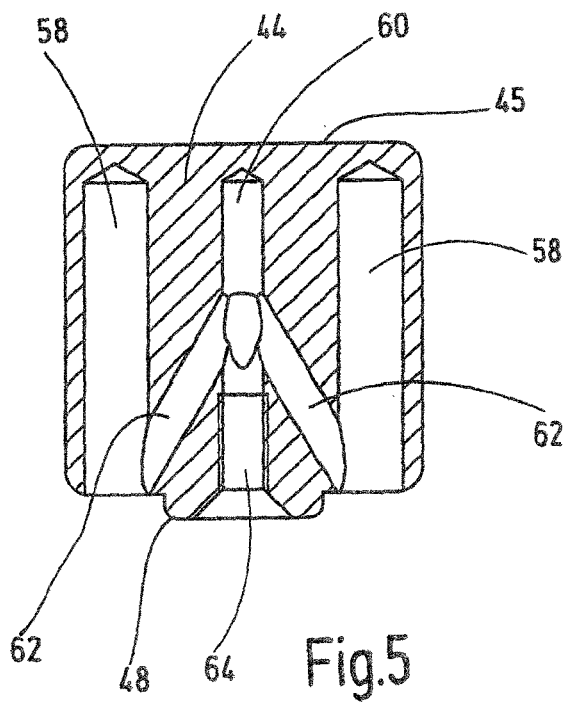

As shown in particular in FIGS. 4 and 5, concerning a bottom view of the float 44 viewed in the direction of its lower end face 46 and a longitudinal section through the float 44, respectively, individual longitudinal drilled holes 58 are introduced from the underside, the centers of which holes 58 lie on a virtual circumferential circle, the diameter of which is smaller than the common virtual outer diameter, formed by the concave curvatures of the longitudinal bars 52. Further, the individual longitudinal drilled holes 58 are located below the respective assignable longitudinal bar 52, when viewed radially, between two groove-like longitudinal channels (50) in the float (44).

As in particular the longitudinal sectional view of FIG. 5 shows, the float 44 further has, in the manner of a further longitudinal drilled hole, a central channel 60 from which, projecting outwards in the manner of a wing, two inclined drilled holes 62 extend, which, emerging from the central channel 60 above a sealing plug 64, merge into two adjacent connected, vertical longitudinal bores 58. The longitudinal drilled holes 58, and optionally the central channel 60 having its two flanking oblique drilled holes 62, are formed in the float 44 either to save weight and/or to trap process gas to increase the buoyancy of the float 44 and/or to receive permanent magnets (not shown), which, as part of the sensing device 42, interact with other parts of the sensing device 42 inserted in the bottom end of the device housing 20 along its longitudinal axis. In this respect, the respective permanent magnet of the float 44, which may also consists of a single magnet device or may consists of a magnetizable metal component, forms an inductive displacement measuring device using other parts of the sensor device 42.

If liquid separation via the coalescing filter element 30 occurs during the gas treatment, the liquid portions accumulate in the lower collection space 32 and in that way flow around the float 44 from the outside, such that the accumulated liquid comes to rest below the float 44 and lifts the latter owing to its buoyancy. The float 44 and the sensor device 42 can be used to continuously monitor the change in the liquid level, and, at a predeterminable threshold value, the sensor device 42 controls the control device 40, as explained above, and this in turn controls the actuating magnet of the valve device 38 such that, when the liquid line 36 is open, the liquid medium accumulated at the bottom in the device housing 10 leaves the collection space 32. In the process, the float 44, viewed in the direction of FIG. 1, is again returned to its lower initial position, which is detected by the sensor device 42, and which, when the control device 40 and the actuating magnet of the valve device 38 are appropriately controlled, results in the valve device 38 closing, which is accompanied by the shutting off of the liquid line 36, and the collection space 32 is available for a fresh collection process for liquid separated from the gas portion.

Below, the second exemplary embodiment is explained in more detail with reference to FIGS. 6 to 9. In this context, the same reference numerals are used for the same components as in the first exemplary embodiment, and the explanations provided in this respect also apply to the second exemplary embodiment, which is explained only insofar as it differs substantially from the previous exemplary embodiment.

Figure 6:
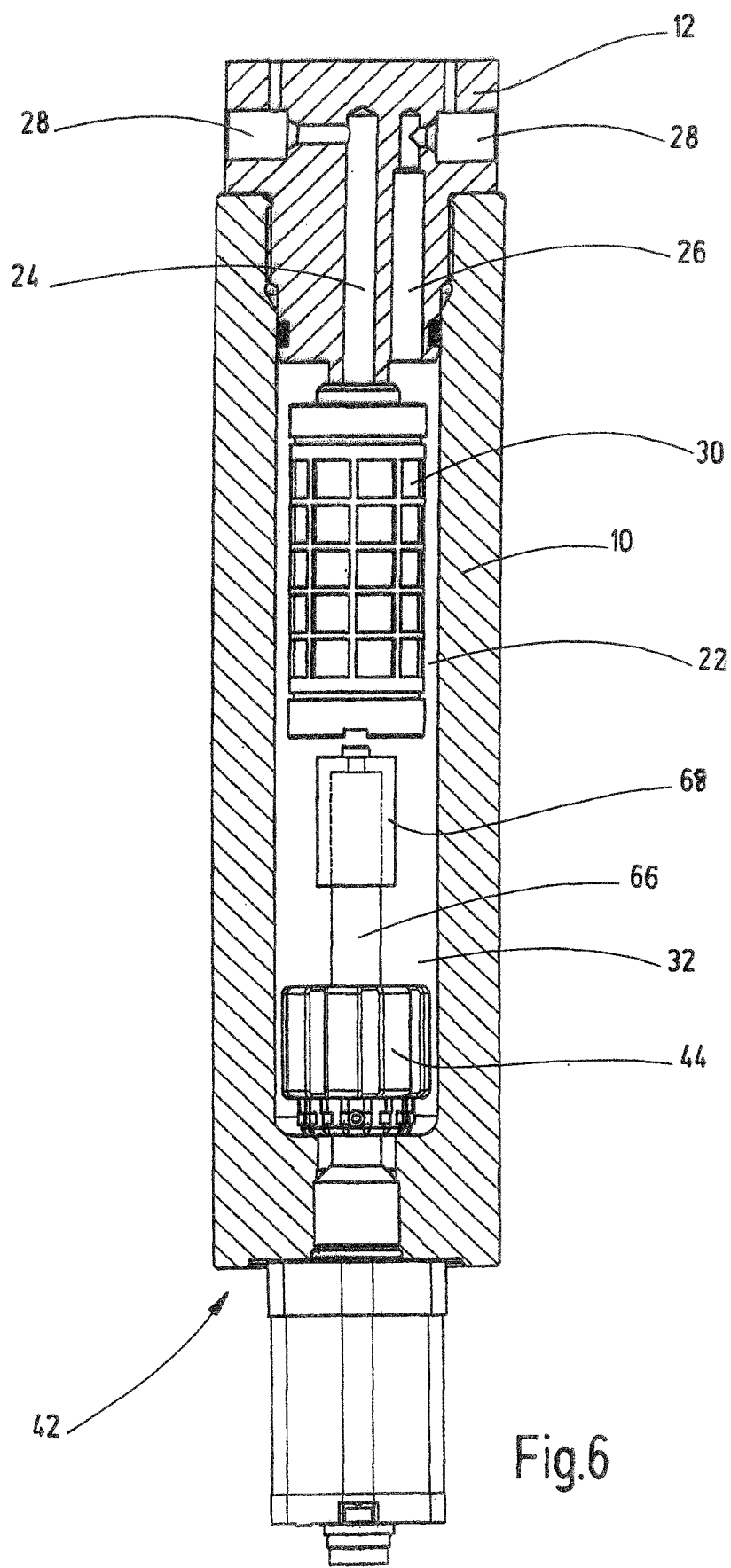
FIG. 6 shows a second exemplary embodiment of the solution according to the invention, partly in longitudinal section, partly in view.

As shown in particular in FIG. 6, in this case the collection space 32 merges directly into the interior chamber 22 of the housing 10 without a shoulder, resulting in the inner diameters of the interior chamber 22 and the collection space 32 being identical. In the exemplary embodiment of FIG. 6, the float 44 is additionally guided along a guide rod 66, wherein a cap 68 closes the guide rod 66 off at the top, which cap 68 is intended to prevent the float 44 from slipping off the guide rod 66. When a guide rod 66 is used, the sensor device again designated as a whole by the reference numeral 42, can be designed as a magnetostrictive measuring system. However, it is also possible to implement an inductive measuring system, as explained above.

Unlike the solution according to FIG. 1, the exemplary embodiment according to FIG. 6 does not provide for emptying the collection space 32. In this case, only process monitoring is to take place and, in the event of an accumulation of liquid in the collection space 32, the overall process would be stopped and the filter 30 would be manually cleaned. Especially for hydrogen applications having a hydrogen pressure in the range of 1000 bar, components having as few sealing points as possible are used to minimize the risk of leakage. In principle, however, a discharge of the separated liquid can also be provided according to the first exemplary embodiment or a discharge in the longitudinal direction of the housing 10.

As can be seen from the illustration according to FIG. 10, which shows the underside of the float 44 according to FIG. 4 for comparison, a further inner row 70 of drilled holes is provided having further longitudinal holes to save weight. Further, according to the embodiments shown in FIGS. 7, 9, and 10, the float 44 has a center recess 72 that serves as a guide along the guide rod 66 throughout. In this respect, the float 44 in its modified embodiment has, starting from the central recess 72, further groove-like longitudinal channels 74 (4 in total), which in turn serve as respective points of passage and open out at the opposite end faces 45, 46 of the float 44.

Viewed in the operating position, there is again a rim 48 at the underside of the float 44, which rim 48 is recessed relative to its other circumference and has two orifice-like receptacles 76 diametrically opposite to the longitudinal axis of the float, for the purpose of receiving the permanent magnets for the sensor device 42, which permanent magnets are not shown in greater detail. If such receptacles 76 are not provided with permanent magnets, they could also form a kind of orifice which establishes a fluid-conveying connection between the center recess 72 and the annular gap 56 between the float 44 and the inner wall 54 of the collection space 32, to dampen the fluid flow with a comparative motion of the float 44 in this manner. On the underside of the recessed rim 48, the latter may be provided with a contact surface 78, which widens conically towards the top and which may form a closed peripheral rim (not shown), which plays a role if a removal opening for the liquid should be arranged on the underside of the collection space 32.

The device solution according to the invention does not have to be limited to the application of hydrogen, but can be used wherever process gases may have liquid portions while forming a fluid mixture. However, because the solution according to the invention generally does not require sealing points, it is particularly suitable for an application of fluid mixtures at very high pressures of 300 to 1000 bar. Because the filter 30 used can also be used to clean off particulate contamination, damage to fuel cells during hydrogen operation is largely avoided in vehicles.

The invention claimed is:

1. A device for the treatment of fluid mixtures containing gases, including hydrogen, air, nitrogen or noble gases, and containing liquids including ionic liquids, hydraulic oil or process liquids, the device comprising:
   a housing;
   a separating stage being in the housing and separating the fluid mixture into a gas portion and a liquid portion,
   a collection space in the housing and connected in fluid communication with the separating stage and receiving the liquid portion;
   a float in the collection space caused by the liquid portion received in the collection space to rise in the collection space to a predeterminable liquid level in the collection space, an outer circumference of the float being guided axially displaceably along an inside of a housing wall of the collection space and having at least one point of passage for gas and/or liquid, the passage interconnecting parts of the collection space in fluid communication, the parts being spatially separated from one another by the float; and
   a sensor connected to the housing and actuated by the float, without contact.

2. The device according to claim 1 wherein
   a discharge is in the housing and is actuated by the sensor to drain the collection space of the liquid portion, resulting in lowering of the float.

3. The device according to claim 1 wherein
   the float (44) has a buoyancy aid compensating for a weight force thereof, the buoyancy aid guiding the gas portion routed through the separation stage, at least partially, to an inside of the float, the float closed off in the direction of the separation stage.

4. The device according to claim 3 wherein
   at least one chamber is in the inside of the float accommodating at least part of the gas portion of the fluid mixture.

5. The device according to claim 4 wherein
   the chamber is introduced into the float in a vertical operating position of the device, from below as a blind hole.

6. The device according to claim 1 wherein
   the float has longitudinal channels along an outer circumference thereof, the channels being introduced into the float in a groove-shaped manner and serving as passages, each of the channels opening out at opposing end faces of the float and extending in parallel to mutually opposite directions of travel of the float in the collection space.

7. The device according to claim 1 wherein
   the float is formed to be rotationally symmetrical.

8. The device according to claim 7 wherein
   the float is mainly cylindrical.

9. The device according to claim 1 wherein
   the float has a central recess guiding along a rod-shaped guide and has groove-shaped longitudinal channels as respective points of passage being introduced into the float in a direction away from the rod-shaped guide and opening out at opposite end faces of the float.

10. The device according to claim 9 wherein
   viewed in an operating position of the device, a rim is arranged at an underside of the float, the rim being recessed relative to a rest of a circumference of the float and being equipped with at least one orifice establishing a media-conveying connection at least between the longitudinal channels and an assignable chamber in the float in which the gas portion is routed.

11. The device according to claim 1 wherein
the float has recesses provided for reducing the weight of the float.
12. The device according to claim 11 wherein
the recesses are drilled holes.
13. The device according to claim 11 wherein
the recesses are hollow chambers closed towards an outside of the float.
14. The device according to claim 1 wherein
parts of the sensor increase a weight force of the float.
15. The device according to claim 14 wherein
the parts comprise at least one permanent magnet.

\* \* \* \* \*